United States Patent
Gospodarek et al.

(10) Patent No.: US 8,948,029 B2
(45) Date of Patent: Feb. 3, 2015

(54) NAMING NETWORK INTERFACE CARDS

(75) Inventors: Andy Gospodarek, Raleigh, NC (US);
Neil Horman, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 256 days.

(21) Appl. No.: 12/950,372

(22) Filed: Nov. 19, 2010

(65) Prior Publication Data
US 2012/0131157 A1 May 24, 2012

(51) Int. Cl.
*H04L 12/28* (2006.01)
*H04L 12/54* (2013.01)
*H04L 12/66* (2006.01)
*G06F 15/16* (2006.01)
*G06F 13/42* (2006.01)
*G06F 13/14* (2006.01)
*G06F 12/10* (2006.01)
*H04L 29/12* (2006.01)

(52) U.S. Cl.
CPC .......... *H04L 61/6022* (2013.01); *H04L 61/103* (2013.01); *H04L 61/3065* (2013.01); *Y02B 60/43* (2013.01)
USPC ........... 370/252; 370/257; 370/401; 370/463; 709/230; 709/250; 709/253; 710/105; 710/305; 711/202

(58) Field of Classification Search
CPC ... H04L 2012/64; H04L 12/64; H04L 65/102; H04L 29/06176; H04L 12/66; H04L 2012/46; H04L 2012/5618; H04L 12/46; H04L 41/04
USPC .......... 370/252, 257, 401, 463; 709/230, 250, 709/253; 710/105, 305; 711/202
See application file for complete search history.

(56) References Cited

U.S. PATENT DOCUMENTS

| | | | |
|---|---|---|---|
| 6,553,421 B1 * | 4/2003 | Frick et al. | 709/227 |
| 7,502,884 B1 * | 3/2009 | Shah et al. | 710/316 |
| 7,707,263 B1 * | 4/2010 | Cramer et al. | 709/212 |
| 2007/0233825 A1 * | 10/2007 | Brownell et al. | 709/220 |
| 2010/0246439 A1 * | 9/2010 | Heath et al. | 370/254 |

OTHER PUBLICATIONS

"Dynamic Host Configuration Protocol (DHCP) and Bootstrap Protocol (BOOTP) Parameters", http://www.iana.org/assignments/bootp-dhcp-parameters/bootp-dhcp-parameters.xhtml; Oct. 28, 2010, 12 pages.
"LLDP-MED and CDP Podcast", *Cisco Systems, Inc.*, Podcast Transcript, 2007, 3 pages.
"Station and Media Access Control Connectivity Discovery", *IEEE Standards*, IEEE Std 802.1AB-2005, May 6, 2005, 172 pages.
"Tutorial on the Link Layer Discovery Protocol", http://www.eetimes.com/design/communications-design/4009357/Tutorial-on-the-Link-Layer-Discovery-Protocol; Feb. 1, 2005; 8 pages.

* cited by examiner

*Primary Examiner* — Alpus H Hsu
*Assistant Examiner* — Walter DiVito
(74) *Attorney, Agent, or Firm* — Lowenstein Sandler LLP (57) ABSTRACT

A method and system for network interface naming is described.

19 Claims, 7 Drawing Sheets

NAMING NETWORK INTERFACE CARDS

TECHNICAL FIELD

Embodiments of the present invention relate to naming network interface cards, and more specifically, to attribute based naming of network interface cards.

BACKGROUND

Network interface cards (NICs), also known as network adapters, network interface controllers, or local area network (LAN) adapters, are hardware devices that handle interfaces to computer networks and allow a computing device, such as a network-capable device, to access the respective networks. The NIC has a read-only memory chip that stores a unique number, the media access control (MAC) address. The MAC address identifies the device uniquely on the network (e.g., LAN). The NIC is both layer 1 (physical layer) and Layer 2 (data link layer) device, since it provides physical access to a networking medium and provides a low-level addressing system, typically using the MAC address. The NICs allow users of the computing devices to connect over wired or wireless networks.

In data-center environments, system administrators struggle to keep network interface card (NIC) names consistent. This is especially problematic when replacing failed components or adding additional systems to an existing infrastructure. For example, adding a NIC to a system may change all of the names of the NICs unexpectedly. Some conventional network interface card naming techniques use the MAC address or a bus address (e.g., a PCI bus address) to name the network interface cards. For example, a network interface card, having a MAC address of 00:02:BC:00:00:01, could be originally assigned a logical interface name, for example, eth0. However, when the network interface card is changed (i.e., replaced by another network interface card) to the MAC address 00:02:BC:00:00:02, the logical interface name becomes indeterminate. Similarly, a network interface card, having a PCI address 00:01:02, could be originally assigned a logical interface name (e.g., eth0). However, when the network interface card is moved to a different slot having a different PCI bus address, or another cards is added to a slot that changes the network interface card's PCI bus address (e.g., PCI address 02:02:02), the logical interface name becomes indeterminate. Since the conventional naming techniques assign logical interface names based on hardware addresses or bus addresses, these conventional techniques cannot reliably and consistently assign logical interface names when changes are made to the network interface cards. Furthermore, these conventional techniques require manual involvement to reconfigure the network configuration when changes are made to ensure naming consistency of the network interface cards of a system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and system for network interface naming is described. In one embodiment, a network interface naming utility receives, at a NIC of a computing system, a communication having a network interface attribute from a network device using a communication protocol. The network configuration attribute identifies a network with which the NIC communicates. The network configuration attribute can be a network name of the network (e.g., net label), an identifier of the network, or a capability attribute of the network. The network interface naming utility assigns a logical interface name to the NIC based on the network configuration attribute. The network configuration attribute is already mapped to the logical interface name, such as by an administration of the computing system. Since the network configuration attribute is not a hardware address (e.g., MAC address) or a bus address (e.g., PCI address), the logical interface name can be mapped to the first network configuration attribute regardless of network interface card's hardware address or bus address, as well as any other local data state information. Additional cards of the computing system can be assigned logical interface names based on the respective network configuration attributes, where the network configuration attributes are already mapped to the respective logical interface names. The network interface cards of the computing system may communicate with the same communication protocol or different communication protocols. In one embodiment, the communication protocol used to communicate the network configuration attribute is a discovery protocol, such as LLDP (IEEE 802.1AB), LLDP-Media Endpoint Discovery (LLDP-MED) (ANSI/TIA-1057), Cisco Discovery Protocol (CDP), Extreme Discovery Protocol, Nortel Discovery Protocol (SONMP), Microsoft Link Layer Topology Discovery (LLTD), and Data Center Bridging Capabilities Exchange Protocol (DCBX). In another embodiment, the communication protocol is the Dynamic Host Configuration Protocol (DHCP). The network interface naming utility may be implemented as part of a network manager or a device manager executed on the computing system.

Embodiments of the present invention provide an improved network interface naming utility that reliably and consistently assigns logical interface names to network interface cards, even when changes are made to the network interface cards, as well when changes are made to the location of these network interface cards. As described above, in datacenter environments, system administrators struggle to keep NIC names consistent, especially when replacing failed components or adding additional computer systems to an existing infrastructure. Unlike the conventional naming techniques that assign logical interface names based on hardware addresses or bus addresses, embodiments of the network interface naming utility assign the logical interface names based on network configuration attributes of the networks with which the network interface card communicates. For example, a way to avoid the unexpected change is to distribute network configuration attributes from a network device to a host computing system, such as, via a Layer 2 protocol (e.g., LLDP). By providing unique configuration for each NIC on the computing system, the NICs can be properly configured or named in a consistent fashion. The embodiments may be used to ensure services associated with a specific logical interface name are assigned to the proper physical NIC. If using LLDP, for example, for NIC configuration, a new TLV structure could be defined (or the reserved TLV data field could be used) to pass network configuration attributes from a network device (such as a switch or router) to the connected host computing system. This network configuration attribute can then be used to map the correct logical device name to the physical NIC connected to that network. Thus, when changes are made to the network interface cards, or the locations of these cards, the naming of these cards is consistent.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "quantifying," "reporting," "executing," "defining," "specifying," "initializing," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 1:
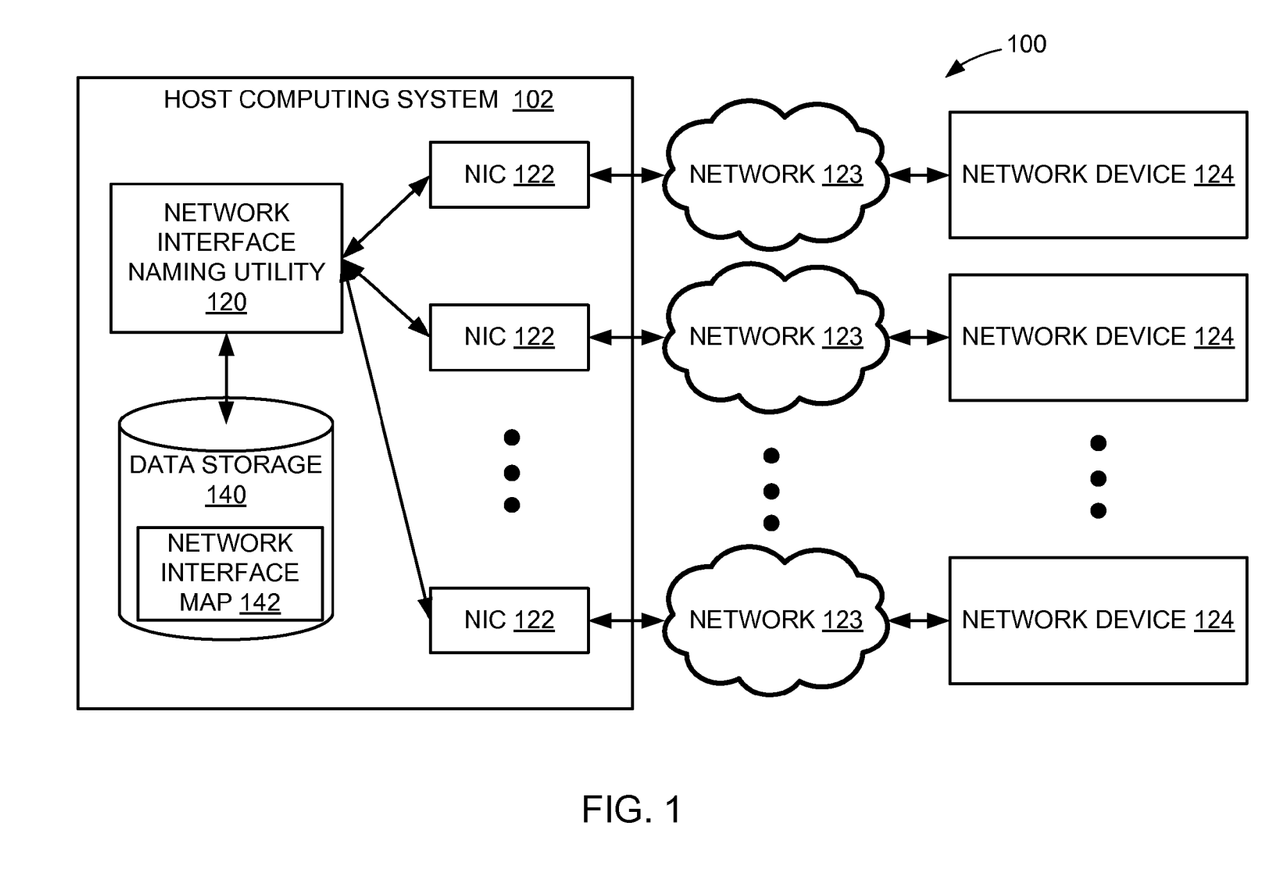
FIG. 1 is a block diagram of an exemplary network architecture in which embodiments of a network interface naming utility may operate.

FIG. 1 is a block diagram of exemplary network architecture 100 in which embodiments of a network interface naming utility 120 may operate. The network architecture 100 may include a host computing system 102, which hosts the network interface naming utility 120, and one or more network devices 124 connected to the host computing system 102 via one or more networks 123. The host computing system 102 includes one or more network interface cards (NICs) 122. The NICs 122 allow the host computing system 102 to communicate with the network device 124 over the networks 123. The one or more networks 123 may each be a private network (e.g., a local area network (LAN), wide area network (WAN), intranet, etc.) or a public network (e.g., the Internet). The host computing system 102 may be one or more machines including one or more server computers, desktop computers, laptop computers, gateways, cellular phones, personal digital assistants (PDAs), other portable or non-portable computing devices. In one embodiment, the host computing system 102 is a server of an enterprise, but is a "client" with respect to the other network devices 124. The network devices 124 may be one or more machines including one or more server computers, gateways, routers, switches, or other network computing devices. The host computing system 102 interacts with the network devices 124 by exchanging messages via one or more communication protocols.

The host computing system 102 executes network interface naming utility 120. The operations of the network interface naming utility 120 are described in more detail below with respect to FIGS. 2C and 3. The network interface naming utility 120 may be a stand-alone application that executes on the host computing system 102 or may be part of a network manager or a device manager executing on the host computing system 102 that may perform other related and/or non-related processes. The host computing system 102 may also include a graphical user interface (GUI) for allowing a user to specify the parameters of the network interface naming utility 120, or to add, delete, or modify entries of the network interface map 142 stored in the data storage 140, described in more detail below.

In the depicted embodiment, the network interface naming utility 120 is coupled to data storage 140, which stores the network interface map 142. The data storage 140 may include one or more storage devices (e.g., the computer-readable medium described above) that are local to the host computing system 102 and/or remote from the host computing system 102. The network interface map 142 may include one or more entries of mappings between network names (e.g., "corporate") and logical interface names (e.g., eth0). In one embodiment, the network interface map 142 is a table having one of the columns be the network configuration attribute and another column be the logical interface name, such as illustrate in the table of FIG. 2C. Alternatively, the network interface map 142 may store the entries using other techniques as would be appreciated by one of ordinary skill in the art having the benefit of this disclosure.

As described in more detail below, the NICs 122 receives communications from the network devices 124 that include network configuration attributes, each network configuration attribute identifying the network with which the respective network interface card communicates. For example, a first NIC communicates with a first network device 124, and the first network device 124 represents a corporate LAN. The network configuration attribute received from the first network device 124 might be the network name of the corporate LAN ("corporate"). The NIC 122 receives the network name ("corporate") in one or more communications from the first network device 124. Based on the received network name, the network interface naming utility 120 assigns the first NIC 122 the logical interface name (eth0) based on the mapping of the logical interface name (eth0) to the network name (corporate) found in the network interface map 142.

Figure 2A:
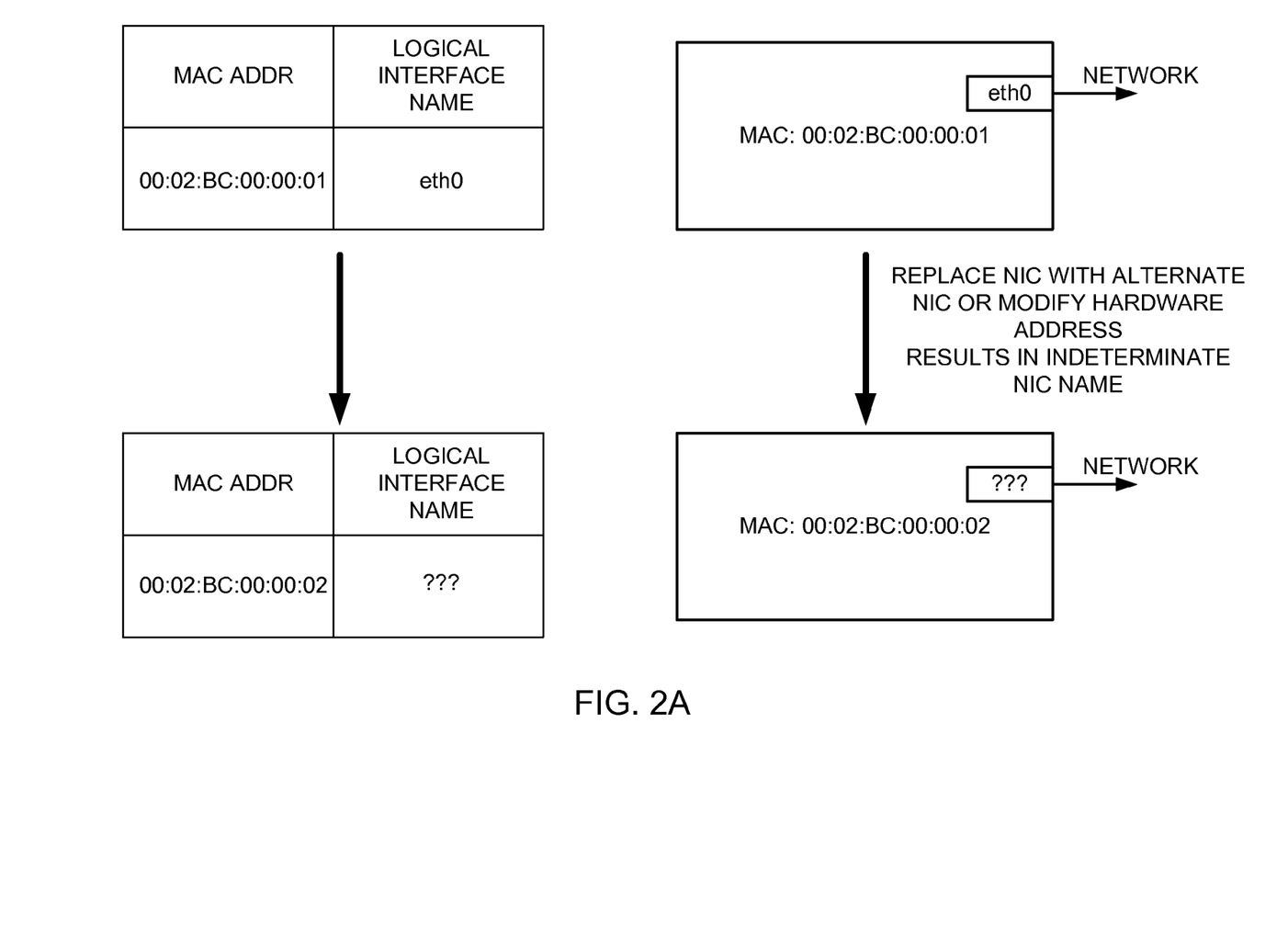
FIG. 2A illustrates a failure in mapping hardware address to a logical interface name using a conventional naming technique.

FIG. 2A illustrates a failure in mapping hardware address to a logical interface name using a conventional naming technique. As described above, when using conventional naming techniques, when a NIC is added to a computing system, some or all of the logical names of the NICs may change unexpectedly. As illustrated in FIG. 2A, a network interface card, having a MAC address of 00:02:BC:00:00:01, is originally assigned a logical interface name, eth0. However, when the network interface card is changed (i.e., replaced by another network interface card, having a different hardware address (e.g., MAC address 00:02:BC:00:00:02) or the hardware address is modified in another way, the logical interface name is changed and becomes indeterminate. When this happens, an administrator of the host computing system would have to manually update the mapping of the new hardware address (e.g., MAC address 00:02:BC:00:00:02) to the appropriate logical interface name, eth0. However, in some cases, the logical interface name of eth0 may have been assigned to another network interface card in the interim. In this case, the administrator would have to manually change multiple mappings between the hardware addresses and the logical interface names.

Figure 2B:
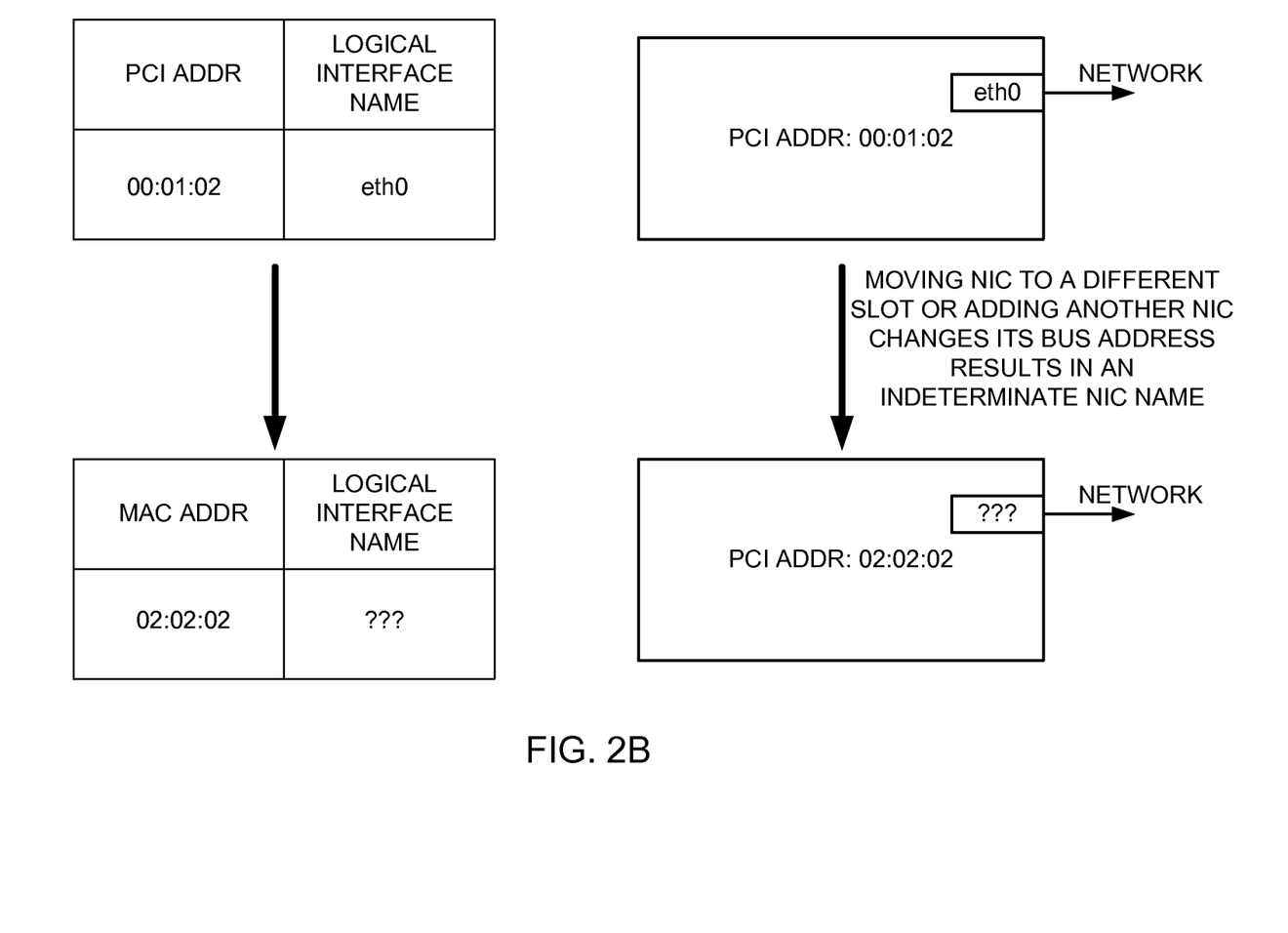
FIG. 2B illustrates a failure in mapping bus address to a logical interface name using a conventional naming technique.

FIG. 2B illustrates a failure in mapping bus address to a logical interface name using a conventional naming technique. As described above, when using conventional naming techniques, when a NIC is moved to a different slot or another NIC is added that changes the bus addresses of one or more NICs, some or all of the logical names of the NICs may change unexpectedly. As illustrated in FIG. 2B, a network interface card, having a bus address (e.g., PCI address 00:01:02), is originally assigned a logical interface name, eth0. However, when the network interface card is moved or another card is added that changes the NIC's bus address (e.g., PCI address 02:02:02), the logical interface name is changed and becomes indeterminate. When this happens, an administrator of the host computing system would have to manually update the mapping of the new bus address (e.g., PCI address 00:01:02) to the appropriate logical interface name, eth0, or to manually update multiple mappings as described above.

Figure 2C:
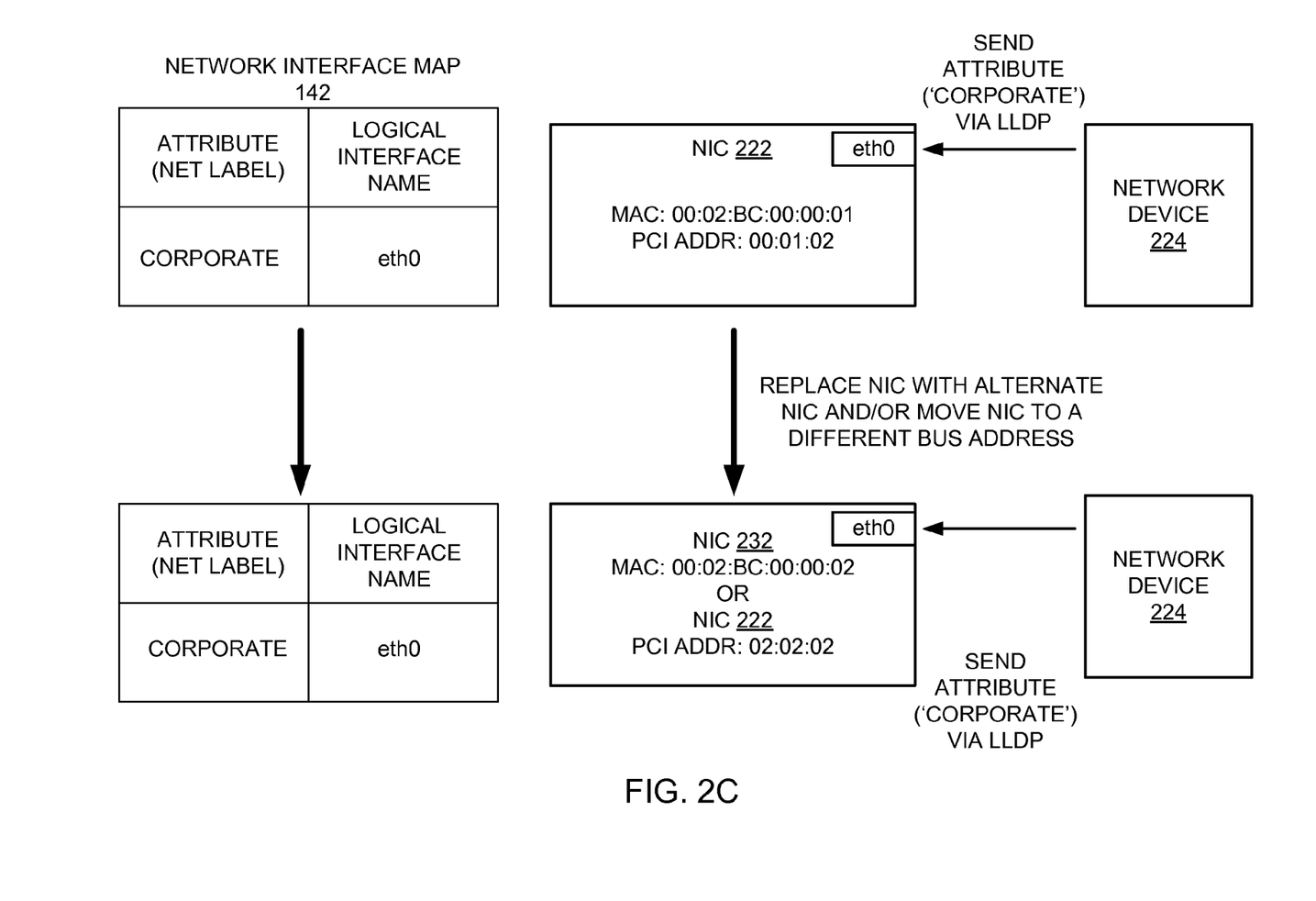
FIG. 2C illustrates a successful mapping of a network configuration attribute to a logical interface name according to one embodiment.

FIG. 2C illustrates a successful mapping of a network configuration attribute to a logical interface name according to one embodiment. With the network interface naming utility 120, when a NIC is replaced with an alternate NIC and/or the NIC is moved to a different slot (e.g., different bus address) or another NIC is added that changes the bus addresses of one or more NICs, the logical names of the NICs do not change. As illustrated in FIG. 2C, a NIC 222 (one of the NICs 122 of FIG. 1), having a hardware address (e.g., MAC address 00:02:BC:00:00:01) and a bus address (e.g., PCI address 00:01:02), receives a communication from a network device 224, which is one of the network devices 124 of FIG. 1. For example, the network device 224 may send communications used to establish a link between the NIC 222 and the network device 224, such as communications used in a discovery protocol (e.g., LLDP). The communication includes a network name or net label (corporate). Upon receiving the network name from the NIC 222, the network interface naming utility 120 assigns the NIC 222 the logical interface name based on the network name attribute received from the network device 224. For example, the network interface naming utility 120 performs a lookup in the network interface map 142 to determine which logical network name is mapped to the network name (corporate). In this case, the network name (corporate) is mapped to the logical interface name (eth0), and thus, the network interface naming utility 120 assigns the logical interface name (eth0) to the NIC 222. It should bed noted that a first network name being mapped to a first logical interface name does not imply ordinal naming, but the interface naming can be arbitrary. For example, a Network card A when receiving a network label X maps that interface name to "Red," and when receiving a network label Y maps that interface name to "Blue."

In one scenario, the NIC 222 is replaced with an alternate NIC 232. It should be noted that the alternate NIC 232 has a different hardware address (e.g., MAC address 00:02:BC:00:00:02) than the hardware address of the NIC 222. Regardless of the hardware address change, the logical interface name will remain consistent. The alternate NIC 232 receives a communication from the network device 224 when establishing the link between the network device 224 and the alternate NIC 232. This communication includes the network name (corporate). The network device 224 sends the network name attribute using a communication protocol, such as the discovery protocol LLDP. Upon receiving the network name from the alternate NIC 232, the network interface naming utility 120 assigns the alternate NIC 232 the logical interface name based on the network name attribute received from the network device 224. For example, the network interface naming utility 120 performs a lookup in the network interface map to determine which logical network name is mapped to the network name (corporate). In this case, the network name (corporate) is mapped to the logical interface name (eth0), and thus, the network interface naming utility 120 assigns the logical interface name (eth0) to the alternate NIC 232. Since the network configuration attribute is the network name attribute and not the hardware address (e.g., MAC address), the logical interface name can be mapped to the network name attribute regardless of alternate NIC's different hardware address.

In another scenario, the NIC 222 is moved to another bus address or another NIC is inserted into the host computing system 120 that changes the NIC's 222 bus address (e.g., PCI address 00:01:02 to 02:02:02). Regardless of the bus address change, the logical interface name will remain consistent. The NIC 222 receives a communication from the network device 224 when establishing the link between the network device 224 and the NIC 222 at the different bus address, the communication including the network name (corporate), for example, via LLDP. Upon receiving the network name from the NIC 222, the network interface naming utility 120 assigns the NIC 222 the logical interface name based on the network name attribute received from the network device 224. As above, the network interface naming utility 120 performs a lookup in the network interface map 142 to determine which logical network name is mapped to the network name (corporate). Since the network name (corporate) is mapped to the logical interface name (eth0), the network interface naming utility 120 assigns the logical interface name (eth0) to the NIC 222 at the different bus address. Since the network configuration attribute is the network name attribute and not the bus address (e.g., PCI address), the logical interface name can be mapped to the network name attribute regardless of NIC's different bus address.

In another scenario, the NIC 222 may be replaced by the alternate NIC 232 and moved to a different bus address. Similar to above, the network interface naming utility 120 assigns the replaced NIC 232 the appropriate logical interface name based on the network name attribute received from the network device 224 with which the alternate NIC 232 communicates. It should also be noted that the network device 224 may also be replaced by another device. If the other network device communicates the network name attribute for the same network as the network device 224, the logical interface name of the NIC 222 (or the alternate NIC 232) will remain consistent. Similarly, if the other network device communicates a different network configuration attribute, identifying a different network, the network interface naming utility 120 will assign the NIC 222 (or the alternate NIC 232) the appropriate logical name based on the different network configuration attribute.

Although the embodiments described above use network names as the network configuration attributes, in other embodiments, other network configuration attributes may be used, such as network identifiers, capacity attributes of the network, or the like.

Figure 3:
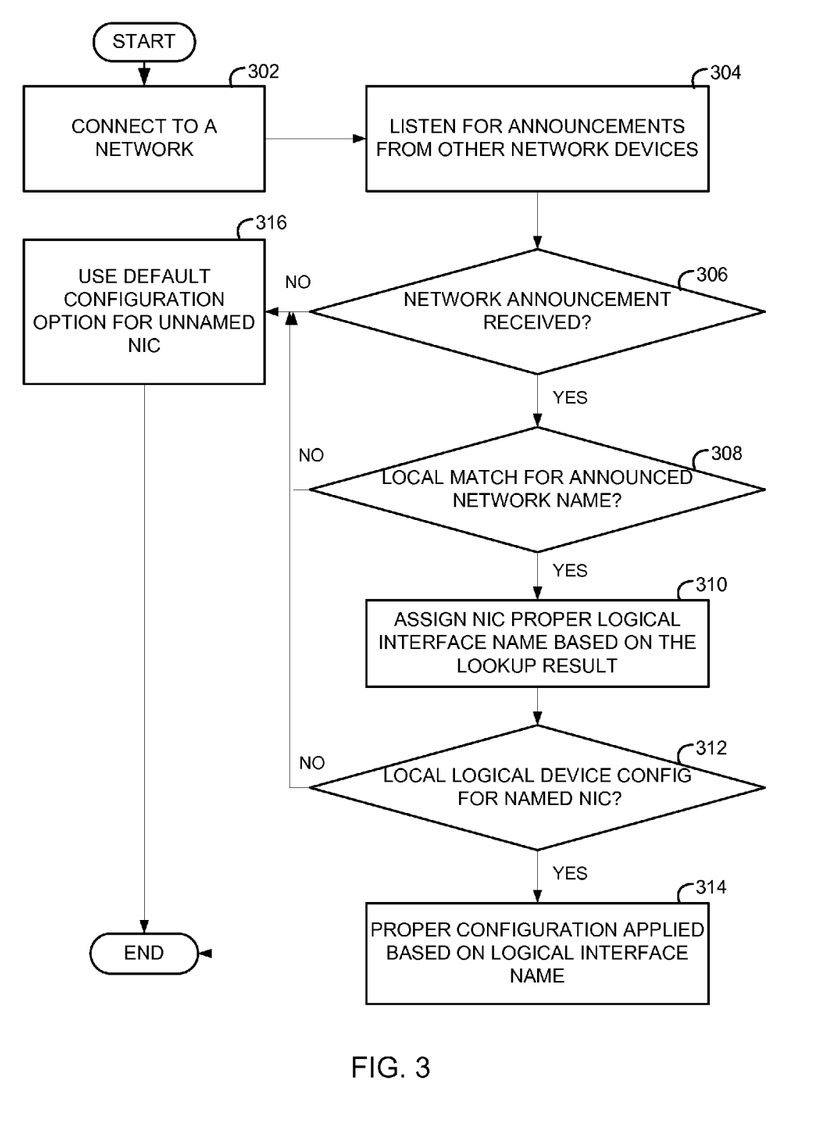
FIG. 3 is a flow diagram of one embodiment of a method of assigning logical interface names to network interface cards based on network configuration attributes.

FIG. 3 is a flow diagram of one embodiment of a method 300 of assigning logical interface names to network interface cards based on network configuration attributes. The method 300 is performed by processing logic that may comprise hardware (circuitry, dedicated logic, etc.), software (such as is run on a general purpose computing system or a dedicated machine), firmware (embedded software), or any combination thereof. In one embodiment, the network interface naming utility 120 of FIG. 1 performs the method 300. Alternatively, other components of the host computing system 102 can perform some or all of the operations of method 300.

Referring to FIG. 3, processing logic begins with a NIC connecting to a network (block 302). This may be done at power up of the computing system, upon plugging in the NIC into the computing system, or upon another event that causes the NIC to establish or reestablish a link to the network. Next, the processing logic monitors for announcements from network devices on the network (block 304), and determines if a network announcement is received (block 306). If a network announcement is received, the processing logic determines if there is a match for the announced network name (net label, e.g., corporate) (block 308). For example, the processing logic performs a lookup in the network interface map 142 to determine if the announced network name is mapped to a logical interface name. Next, if there is a local match for the announced network name, processing logic assigns the NIC the proper logical interface name based on the lookup result (block 312). Next, processing logic determines if there is local logical device configuration for the named NIC (block 312). If so, the processing logic applies the proper configuration based on the logical interface name (block 314) and the method 300 ends. However, if at block 306, no network announcement is received, the processing logic uses a default configuration option for the unnamed NIC (block 316). Similarly, if the processing logic does not find a local match for the announced network name at block 308, or there is no local logical device configuration for the named NIC at block 312, the processing logic proceeds to block 316 to use the default configuration option, and the method 300 ends.

In another embodiment of the method, the processing logic receives a first network configuration attribute from a first network device using a first communication protocol. This communication is received at a first NIC of the computing system. The first network configuration attribute identifies a first network with which the first NIC communicates. The processing logic assigns a first logical interface name to the first NIC based on the first network configuration attribute received from the network device. In one embodiment, the processing logic assigns the first logical interface name regardless of a hardware address or a bus address of the first NIC. In another embodiment, the processing logic assigns the first logical interface name based on the network configuration attribute as a primary factor, but may use hardware addresses and/or bus addresses as secondary factors, such as, for example, when there is a conflict between two NICs having the same network configuration attribute or the same logical interface name.

Similar to the embodiment described above with respect to FIG. 3, the processing logic can connect to the first network using the first NIC, and monitors for network announcements from other devices on the first network. The network announcement is the received communication that includes a network name (or other attribute) as the network configuration attribute. Upon receipt of the network name, the processing logic performs a lookup in a local network map (e.g., network interface map 142) for a match for the announced network name. In this embodiment, the local network map includes mappings between network names and logical interface names. Based on the lookup result, the processing logic assigns the first logical interface name to the first NIC. Like above in FIG. 3, when the lookup results in no match, the processing logic applies a default configuration to the first, unnamed NIC.

In one embodiment of the method 300, the processing logic receives, at an alternate NIC that has replaced the first NIC, a subsequent communication that includes the same first network configuration attribute received by the first NIC. As such, the alternate NIC is communicating with the same network as the first NIC. The first network configuration attribute received by the alternate NIC is already mapped to the first logical interface name. Thus, the processing logic assigns the first logical interface name (the same name as the first NIC) to the alternate NIC. In this embodiment, although the alternate NIC replaced the first NIC, the logical interface name remains consistent for the network.

In another embodiment of the method, the processing logic receives a second network configuration attribute, via a second NIC, from a second network device using a second communication protocol. The second network configuration attribute identifies a second network with which the second NIC communicates. The processing logic assigns a second interface name to the second NIC based on the second network configuration attribute received from the second network device. The first and second communication protocols may be different protocols, for example, the first communication protocol may be LLDP, whereas the second protocol may be CDP, for example, or vice versa. Alternatively, the first and second communication protocols may be the same protocol. In other embodiments, the host computing system may include more than two NICs, and can consistently assign the logical interface names to the respective NICs based on the respective network configuration attributes regardless of the hardware addresses and/or bus addresses of the NICs of the computing system.

In one embodiment of the method 300, the processing logic receives a subsequent communication at a second NIC, the subsequent communication including the first network configuration attribute. This may be a result of a physical connection between the first network device and the first NIC being changed to be between the first network device and the second NIC. As such, the second NIC is now communicating with the same first network with which the first NIC was communicating. The first network configuration attribute received by the second NIC is already mapped to the first logical interface name. Thus, the processing logic assigns the first logical interface name (the same name as the first NIC) to the second NIC. In this embodiment, although the physical connection has been changed from the first NIC to the second NIC, the logical interface name remains consistent.

In one embodiment of the method 300, the processing logic receives a subsequent communication, including the first network configuration attribute, at the first NIC at a different bus location than the initial communication. This may occur when the first NIC is assigned a new bus address because the first NIC has moved to a different bus location or because another card is changed that causes the bus address of the first NIC to change. The first network configuration attribute received by the first NIC at the different bus address is already mapped to the first logical interface name. Thus, the processing logic assigns the first logical interface name (the same name as the first NIC at the first bus address) to the second NIC, despite the first NIC being at a different bus address. In this embodiment, although the first NIC's bus address has been changed, the logical interface name remains consistent.

In one embodiment, the communication protocol is a discovery protocol, such as LLDP. LLPD is a link layer protocol in the Internet Protocol suite used by network devices for advertising their identity, capabilities, and neighboring devices on a LAN, for example. LLDP performs functions similar to the other discovery protocols to gather information of the network devices on a network. The topology of an LLDP-enabled network can be discovered by crawling the hosts and querying a database that stores this gathered information, including system name and description, port name and description, VLAN name, IP management address, system capabilities (switching, routing, etc), MAC and PHY information, etc. The LLDP communication from the network device can be modified to include the network configuration attribute. The data structure of the LLDP Ethernet frame having the network configuration attribute is illustrated and described with respect to FIG. 4A.

Figure 4A:
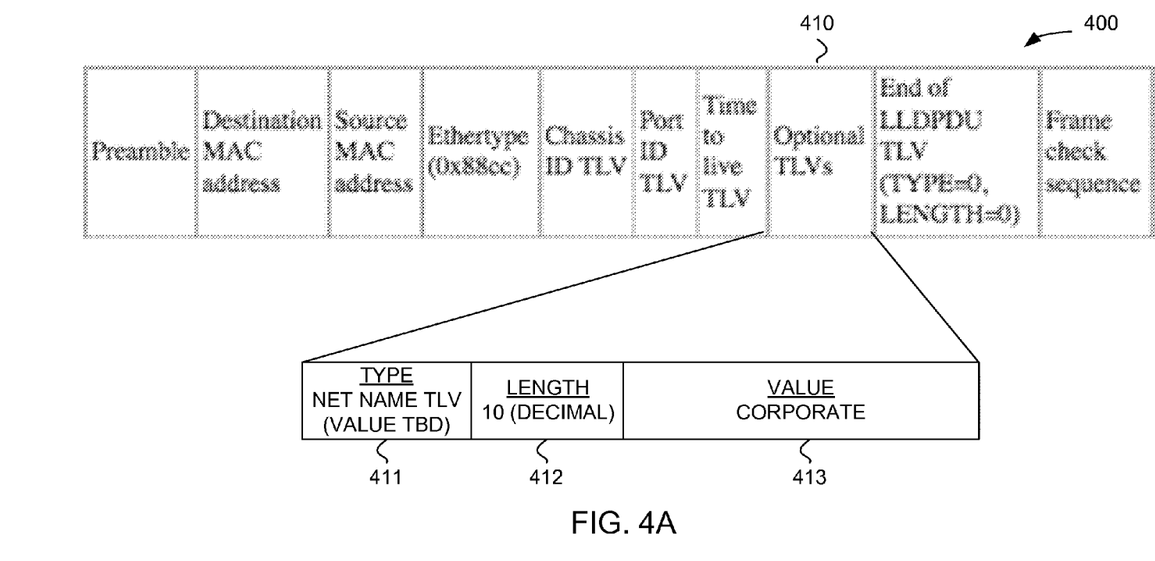
FIG. 4A is a diagram of a data structure of a Link Layer Discovery Protocol (LLDP) Ethernet frame structure having a network configuration attribute, according to one embodiment.

FIG. 4A is a diagram of a data structure of a LLDP Ethernet frame structure 400 having a network configuration attribute, according to one embodiment. LLDP information is sent by network devices from each of their interfaces at a fixed frequency in form of an Ethernet frame. The Ethernet frame used in LLDP has a preamble, a destination MAC address, a source MAC address, and an Ethertype. Each Ethernet frame contains one Link Layer Discovery Protocol Data Unit (LLDPDU). Each LLDPDU is a sequence of type-length-value (TLV) structures, including chassis ID TLV, port ID TLV, Time to Live TLV, optional TLVs 410, and ending with a special TLV, named LLDPDU in which both the type and length fields are zero. The frame also includes a frame check sequence. In one embodiment, the optional TLV 410 can be configured to include the network configuration attribute. As depicted in the blown-up view, the optional TLVs 410 includes a type 411, a length 412, and a value 413. The type 411 may include the type of the network configuration attribute, such as network name TLV, network identifier TLV, or the like. The length specifies the length of the network configuration attribute, such as 10 decimal, and the value 413 includes the attribute's value, such as the network name "corporate" (e.g., net name TLV). It should be noted that length is part of the frame format for the particular protocol used and may be a fixed value or may be a variable value from one protocol to the next.

In this case of LLDP being used for network naming, the LLDP messages would be broadcast on the network with the network name "corporate" included in the frames to be used by the network interface naming utility for naming the NIC receiving the frames. When a host computing system sees this message, the network interface naming utility will use local configuration to map the "corporate" network name to a specific logical interface name to the operating system (e.g., eth0) and the configuration for the logical interface name could then be applied to the appropriate network interface card.

In other embodiments, other link layer protocols than LLDP may be used. For example, LLDP-MED (Media Endpoint Discovery) is an enhancement of LLDP. LLDP-MED provides the ability for auto-discovery of LAN policies (Such as VLAN, Layer 2 priority services, enabling plug and play networking, and device location discovery to allow creation of location database. LLDP-MED also provides extended and automated power management of Power over Ethernet end points, inventory management, allowing network administrators to track their network devices, and determine their characteristics. In other embodiments, other communication protocols may be used, such as other link layer protocols (Layer 2 protocols), transport layer protocols (Layer 3 protocols), and application layer protocols (Layer 4 protocols), such as DHCP. DHCP is an application layer protocol that runs over User Datagram Protocol (UDP), but can be used without the need to have any Layer 3 information, such as, IPv4 address. The data structure of the DHCP frame having the network configuration attribute is illustrated and described with respect to FIG. 4B. Although DHCP may be used, the typical use-case for the embodiments will be protocols that do not typically sit on top of a TCP or UDP layer, but are their own link-layer protocol. However, given that some application and transport protocols, like UDP, require Layer 3 protocol information (such as an IP address which may be obtained differently depending on the network to which it is attached), the Layer 2 protocols like LLDP, CDP, or the like, may be pragmatic solutions. Alternatively, other protocols may be used to rename a link at anytime based on the network configuration attribute.

Figure 4B:
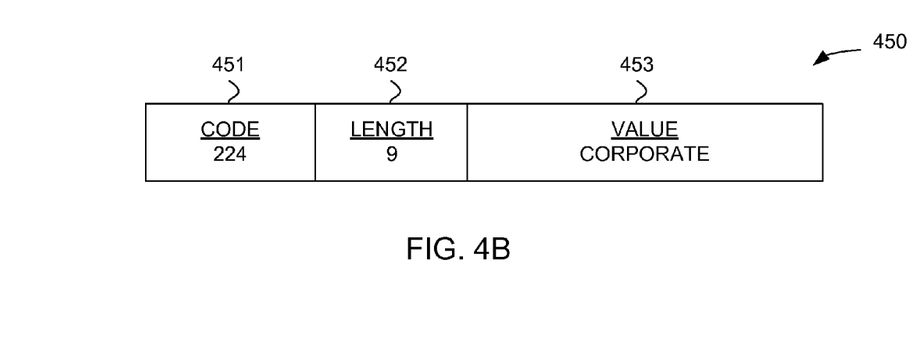
FIG. 4B is a diagram of a data structure of a Dynamic Host Configuration Protocol (DHCP) frame structure having a network configuration attribute, according to one embodiment.

FIG. 4B is a diagram of a data structure of a Dynamic Host Configuration Protocol (DHCP) frame structure having a network configuration attribute, according to one embodiment. DHCP is an auto-configuration protocol used on IP networks in which computers that are connected to the network must be configured before they can communicate with other computers on the network. DHCP allows a computer to be configured automatically, eliminating the need for intervention by a network administrator. It also provides a central database for keeping track of computers that have been connected to the network. This prevents computers from accidentally being configured with the same IP address. It should be noted that the DHCP protocol may be DHCP for IPv4 or DHCP for IPv6.

When a DHCP-configured client of the host computing system connects to a network, the DHCP client sends a broadcast query requesting necessary information from a DHCP server (e.g., on one of the network devices 124). In response, the DHCP server assigns the computer an IP address, a lease (length of time the allocation is valid), and other IP configuration parameters, such as the subnet mask and the default gateway. In one embodiment, the DHCP response could be configured to include the DHCP frame 450, which includes the network configuration attribute. As depicted in FIG. 4B, the DHCP frame 450 includes a code 451 (e.g., option code 224), a length 452 (e.g., 9 decimal), and a value 453 having the network name (e.g., "corporate") or other network configuration attributes as would be appreciated by one of ordinary skill in the art having the benefit of this disclosure. When the DHCP is used as the protocol for carrying the network name, one of the 'removed' or 'unassigned' options could be used to carry the network name or other network configuration attributes. These options are not always specified, but when they are specified, these options can be easily passed to outside applications to act on them. After the network name is received, the appropriate configuration could be applied to the NIC and any needed configuration could take place.

Figure 5:
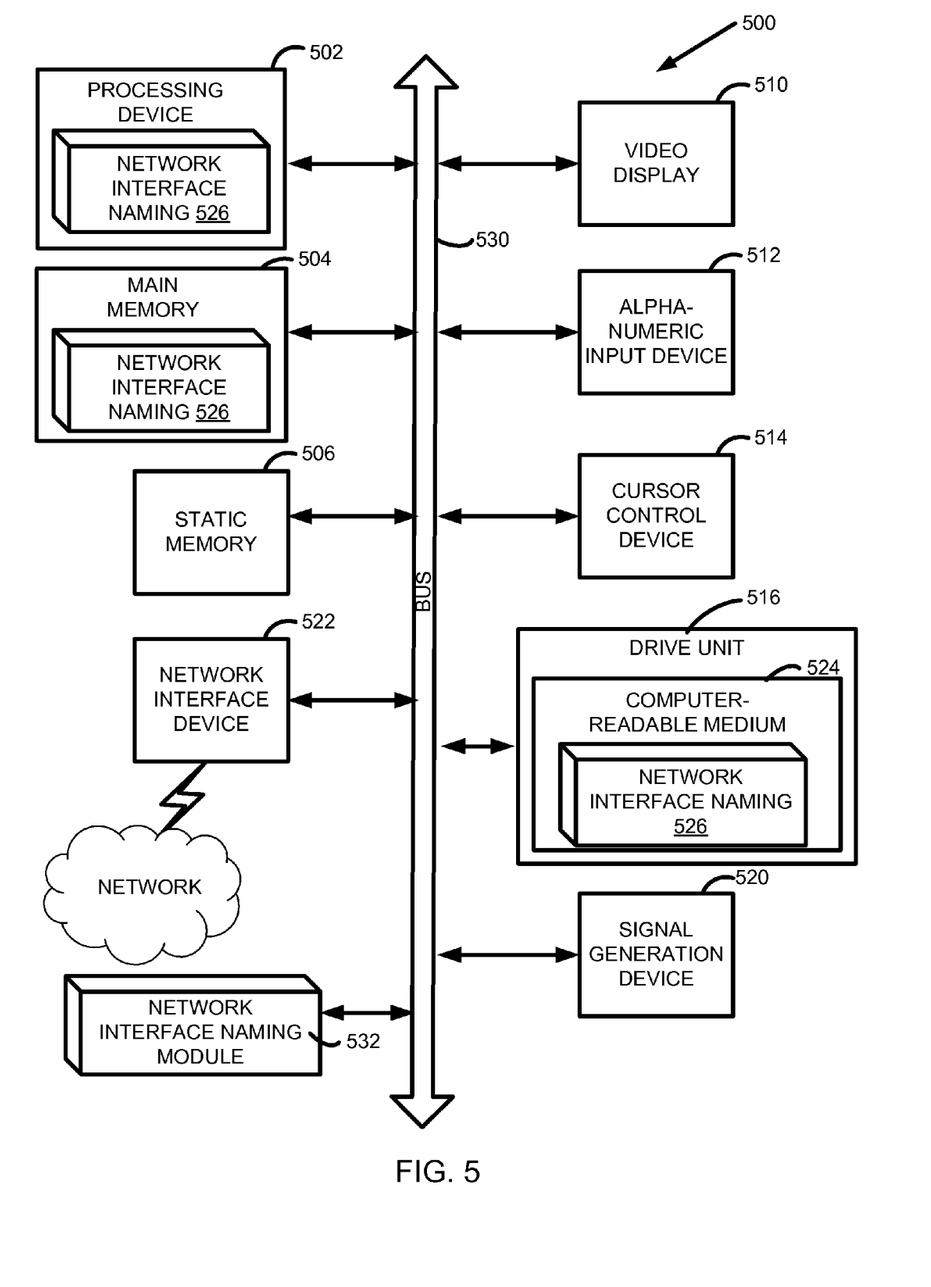
FIG. 5 illustrates a diagrammatic representation of a machine in the exemplary form of a computing system for network interface naming.

FIG. 5 illustrates a diagrammatic representation of a machine in the exemplary form of a computing system 500 for network interface naming. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for network interface naming, such as the method 300 described above. In one embodiment, the computing system 500 represents various components that may be implemented in the host computing system 102 as described above. Alternatively, the host computing system 102 may include more or less components as illustrated in the computing system 500.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., network interface naming 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., network interface naming 526) embodying any one or more of the methodologies or functions described herein. The network interface naming 526 may also reside, completely or at least partially, within the main memory 504 and/or within the processing device 502 during execution thereof by the computing system 500, the main memory 504 and the processing device 502 also constituting computer-readable storage media. The network interface naming 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The network interface naming module 532, components, and other features described herein (for example in relation to FIGS. 1, 2C, 3, and 4) can be implemented as discrete hardware components or integrated in the functionality of hardware components such as ASICS, FPGAs, DSPs, or similar devices. The network interface naming module 532 may implement operations of network interface naming as described herein with respect to FIG. 3. In addition, the network interface naming module 532 can be implemented as firmware or functional circuitry within hardware devices. Further, the network interface naming module 532 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
monitoring, by a processing device of a first network interface card (NIC) of a computing system, for a first announcement comprising a first logical interface name from a first network device on a first network wherein the first announcement uses a first communication protocol that comprises a first network configuration attribute that identifies the first network;
receiving, at the first NIC, the first announcement from the first network device to establish a link between the first NIC and the first network device;
assigning the first logical interface name to the first NIC in view of the first network configuration attribute received from the first network device, wherein the first network configuration attribute is mapped to the first logical interface name, wherein the mapping is stored at the computing system comprising the first NIC, and wherein the first network configuration attribute is one of a network name of the first network, an identifier of the first network, and a capability attribute of the first network;
in response to a physical connection between the first network device and the first NIC is changed to be between the first network device and the second NIC:
receiving, at a second NIC of the computing system, a subsequent announcement comprising the first network configuration attribute, wherein the first network configuration attribute identifies the first network with which the second NIC communicates, and wherein the first network configuration attribute received by the second NIC is already mapped to the first logical interface name; and
assigning the first logical interface name to the second NIC in view of the first network configuration attribute received at the second NIC;
in response to the first NIC is moved to a different bus address:
receiving, at the first NIC at the different bus address, the subsequent announcement comprising the first network configuration attribute; and
assigning the first logical interface name to the first NIC at the different bus address in view of the first network configuration attribute received at the first NIC at the different bus address.

2. The method of claim 1, wherein the first logical interface name is mapped to the first network configuration attribute regardless of a hardware address or a bus address of the first NIC.

3. The method of claim 1, further comprising:
receiving, at the second network interface card (NIC) of the computing system, a second announcement comprising a second logical interface name from a second network device to establish a second link between the second NIC and the second network device, wherein the second announcement uses a second communication protocol that comprises a second network configuration attribute that identifies a second network from which the second NIC receives the second announcement; and
assigning a second logical interface name to the second NIC in view of the second network configuration attribute received from the second network device, wherein the second network configuration attribute is mapped to the second logical interface name.

4. The method of claim 3, wherein the first communication protocol and second communication protocol are the same communication protocol.

5. The method of claim 1, further comprising:
receiving, at an alternate NIC that has replaced the first NIC, a subsequent announcement, comprising the first network configuration attribute, wherein the first network configuration attribute identifies the first network with which the alternate NIC communicates, and wherein the first network configuration attribute received by the alternate NIC is already mapped to the first logical interface name; and
assigning the first logical interface name to the alternate NIC in view of the first network configuration attribute received at the alternate NIC.

6. The method of claim 1, wherein the first communication protocol is a discovery protocol.

7. The method of claim 6, wherein the discovery protocol is a Link Layer Discovery Protocol (LLDP).

8. The method of claim 1, wherein the first communication protocol is a Dynamic Host Configuration Protocol (DHCP).

9. A method comprising:
monitoring, by a processing device of a first network interface card (NIC) of a computing system, for a first announcement comprising a first logical interface name from a first network device on a first network wherein the first announcement comprises a first network configuration attribute that identifies the first network;
receiving, at the first NIC, the first announcement using a first communication protocol;
assigning the first logical interface name to the first NIC in view of the first network configuration attribute received from the first network device, wherein the first network configuration attribute is mapped to the first logical interface name, wherein the mapping is stored at the computing system comprising the first NIC, and wherein the first network configuration attribute is one of a network name of the first network, an identifier of the first network, and a capability attribute of the first network;
connecting to the first network using the first NIC;
monitoring for network announcements from other devices on the first network, wherein the received first announcement is a network announcement received from the first network device; and
upon receipt of the network announcement from the first network device,
performing a lookup in a local network map for a match for the announced network name, the local network map comprising mappings between network names and logical interface names,
assigning the first logical interface name to the first NIC in view of the lookup;
in response to a physical connection between the first network device and the first NIC is changed to be between the first network device and the second NIC:
receiving, at a second NIC of the computing system, a subsequent announcement, comprising the first network configuration attribute, wherein the first network configuration attribute identifies the first network with which the second NIC communicates, and wherein the first network configuration attribute received by the second NIC is already mapped to the first logical interface name; and
assigning the first logical interface name to the second NIC in view of the first network configuration attribute received at the second NIC;

in response to the first NIC is moved to a different bus address:

receiving, at the first NIC at the different bus address, the subsequent announcement comprising the first network configuration attribute; and assigning the first logical interface name to the first NIC at the different bus address in view of the first network configuration attribute received at the first NIC at the different bus address.

10. The method of claim 9, wherein in response to the lookup results in no match, applying a default configuration to the first NIC.

11. A non-transitory computer readable storage medium comprising instructions that, when executed by a computing system, cause the computing system to execute operations comprising:

monitoring, by a processing device of a first network interface card (NIC) of the computing system, for a first announcement comprising a first logical interface name from a first network device on a first network wherein the first announcement uses a first communication protocol that comprises a first network configuration attribute that identifies the first network;

receiving, at the first NIC, the first announcement from the first network device to establish a link between the first NIC and the first network device;

assigning the first logical interface name to the first NIC in view of the first network configuration attribute received from the first network device, wherein the first network configuration attribute is mapped to the first logical interface name, wherein the mapping is stored at the computing system comprising the first NIC, and wherein the first network configuration attribute is one of a network name of the first network, an identifier of the first network, and a capability attribute of the first network;

in response to a physical connection between the first network device and the first NIC is changed to be between the first network device and the second NIC:

receiving, at a second NIC of the computing system, a subsequent announcement comprising the first network configuration attribute, wherein the first network configuration attribute identifies the first network with which the second NIC communicates, and wherein the first network configuration attribute received by the second NIC is already mapped to the first logical interface name; and assigning the first logical interface name to the second NIC in view of the first network configuration attribute received at the second NIC;

in response to the first NIC is moved to a different bus address:

receiving, at the first NIC at the different bus address, the subsequent announcement comprising the first network configuration attribute; and assigning the first logical interface name to the first NIC at the different bus address in view of the first network configuration attribute received at the first NIC at the different bus address.

12. The non-transitory computer readable storage medium of claim 11, wherein the logical interface name is mapped to the network configuration attribute regardless of a hardware address or a bus address of the NIC.

13. The non-transitory computer readable storage medium of claim 11, wherein the operations further comprise:

connecting to the network using the NIC;

monitoring for network announcements from other devices on the network, wherein the received first announcement is a network announcement received from the network device; and upon receipt of the network announcement from the network device, performing a lookup in a local network map for a match for the announced network name, the local network map comprising mappings between network names and logical interface names, and assigning the logical interface name to the NIC in view of the lookup.

14. The non-transitory computer readable storage medium of claim 11, wherein the operations further comprise:

receiving, at an alternate NIC that has replaced the NIC, a subsequent announcement, comprising the network configuration attribute, wherein the network configuration attribute identifies the network with which the alternate NIC communicates, and wherein the network configuration attribute received by the alternate NIC is already mapped to the logical interface name; and assigning the logical interface name to the alternate NIC in view of the network configuration attribute received at the alternate NIC.

15. The non-transitory computer readable storage medium of claim 11, wherein the communication protocol is a Link Layer Discovery Protocol (LLDP).

16. The non-transitory computer readable storage medium of claim 11, wherein the communication protocol is a Dynamic Host Configuration Protocol (DHCP).

17. A system comprising:

a first network interface card (NIC);

data storage to store a local network map comprising mappings between network names and logical interface names; and a network interface naming utility, coupled to the data storage and the first NIC, wherein the network interface naming utility comprises a processing device to:

monitor for a first announcement comprising a first logical interface name from a first network device on a first network wherein the first announcement uses a first communication protocol that comprises a first network configuration attribute that identifies the first network, receive the first announcement from the first network device to:

establish a link between the first NIC and the first network device, assign the first logical interface name to the first NIC in view of a first network configuration attribute of a first announcement received at the first NIC using a first communication protocol, wherein the network interface naming utility is to assign the first logical interface name in view of one of the mappings between the network names and the logical interface names stored in the data storage at a computing system comprising the first NIC, and wherein the first network configuration attribute is one of a network name of the first network, an identifier of the first network, and a capability attribute of the first network, in response to a physical connection between the first network device and the first NIC is changed to be between the first network device and the second NIC:

receive, at a second NIC of the computing system, a subsequent announcement comprising the first network configuration attribute, wherein the first network configuration attribute identifies the first network with which the second NIC communicates, and wherein the first network configuration attribute received by the second NIC is already mapped to the first logical interface name, and assign the first logical interface name to the second NIC in view of the first network configuration attribute received at the second NIC, in response to the first NIC is moved to a different bus address:

receive, at the first NIC at the different bus address, the subsequent announcement comprising the first network configuration attribute, and assign the first logical interface name to the first NIC at the different bus address in view of the first network configuration attribute received at the first NIC at the different bus address.

18. The system of claim 17, further to assign a second logical interface name to the second NIC in view of a second network configuration attribute of a second announcement comprising a second network identifier received at the second NIC using the first communication protocol, and wherein the network interface naming utility is to assign the second logical interface name in view of one of the mappings between the network names and the logical interface names stored in the data storage.

19. The system of claim 17, wherein the network interface naming utility is implemented in at least one of a network manager to be executed on a computing system or a device manager to be executed on the computing system.

* * * * *